United States Patent [19]

Mizumachi

[11] Patent Number: 5,560,040
[45] Date of Patent: Sep. 24, 1996

[54] LIBRARY UNIT SHARING SYSTEM FOR ENSURING SEQUENTIAL RECORDING MEDIA ACCESS

[75] Inventor: Hiroaki Mizumachi, Tokyo, Japan

[73] Assignee: NEC Corporation, Tokyo, Japan

[21] Appl. No.: 439,098

[22] Filed: May 11, 1995

Related U.S. Application Data

[63] Continuation of Ser. No. 799,102, Nov. 27, 1991, abandoned.

[30] Foreign Application Priority Data

Nov. 27, 1990 [JP] Japan .................................. 2-327378

[51] Int. Cl.$^6$ .................................................. G06F 13/00
[52] U.S. Cl. ....................... 395/821; 395/427; 395/800; 369/30; 369/34
[58] Field of Search .................................. 395/800, 425, 395/275; 364/DIG. 1; 414/786, 277; 369/30; 360/92; 379/88

[56] References Cited

U.S. PATENT DOCUMENTS

| | | | |
|---|---|---|---|
| 4,625,081 | 11/1986 | Lotito et al. .............................. | 379/88 |
| 5,121,483 | 6/1992 | Monahan et al. ......................... | 395/275 |
| 5,214,768 | 5/1993 | Martin et al. ............................ | 395/425 |
| 5,247,640 | 9/1993 | Maehara .................................. | 395/425 |

OTHER PUBLICATIONS

Yang et al., "Design and Analysis of Multiple–Bus Arbiters with Different Priority Schemes", IEEE, Mar. 7–9, 1990, pp. 238–247.

*Primary Examiner*—Alyssa H. Bowler
*Assistant Examiner*—Walter D. Davis, Jr.
*Attorney, Agent, or Firm*—Foley & Lardner

[57] ABSTRACT

The present library unit sharing system is provided with a sharing control unit to control access by multiple computers to a library unit which contains multiple recording media. In response to an access request from a computer, a resource allocation means allocates an I/O unit and a mount control means issues an instruction to load a specified recording means into the allocated I/O unit. The mount control means, upon receipt of a recording medium absence notice, sets a timer of a timer retry means to a certain period of time. The timer retry means restarts after the set time has elapsed and then issues a reloading instruction to the mount control means.

1 Claim, 3 Drawing Sheets

LIBRARY UNIT SHARING SYSTEM FOR ENSURING SEQUENTIAL RECORDING MEDIA ACCESS

This application is a continuation application Ser. No. 07/799,102, filed Nov. 27, 1991, now abandoned.

BACKGROUND OF THE INVENTION

1. Field of the Invention

This invention relates to a library unit sharing system wherein a library unit (assembled-type unit) containing multiple recording media is shared by multiple computers for use.

2. Description of the Prior Art

Conventionally, a library unit containing multiple recording media has been provided. In the unit, a specified recording medium is loaded into an I/O unit in response to an access request from a computer to perform data read/write operations. Such a library unit is accessed from multiple computers for use under the control of a conventional system. However, the conventional system has been designed on the precondition that the same recording medium on the library unit is not accessed by multiple computers at a time and in fact, it does not deal with requests for access made by multiple computers simultaneously.

Thus, whenever multiple computers make requests for use of the same recording medium at a time, the loading process requested by one of the computers results in an error because of the absence of that recording medium. Consequently, the loading process fails and the program abnormally terminates.

SUMMARY OF THE INVENTION

It is, therefore, an object of the present invention to provide a library unit sharing system, which can implement sequential usage of each recording medium if multiple requests are simultaneously made by multiple computers to access the same recording medium when the library unit is shared by the computers for use. This sequential usage is accomplished by forcing the succeeding computer to wait until the preceding computer finishes its use of the recording medium. In addition, that sequential usage of the recording medium can help avoid any loading failure or abnormal program termination due to the absence of a recording medium.

The above object can be attained by a preferred embodiment of the present invention, wherein a library unit sharing system is comprised of a library unit shared and accessed by multiple computers, and a sharing control unit to control access made by those computers to the library unit. The library unit includes multiple cells each of which contains multiple recording media and has its own cell address, multiple I/O means which perform read/write operations on the recording media, and a means which loads the recording media into the I/O means. The sharing control unit includes a resource allocation means for allocating the I/O means in response to a recording medium access request from the computer and then issues an instruction to load a specified recording medium into the allocated I/O means; a mounting means for controlling loading of the specified recording medium into the I/O means and issues a recording medium absence notice if the specified recording medium is absent; a timer retry means for setting a certain period of time for the specified I/O means and issues a reloading instruction after the set time has elapsed; and a mount control means for directing the mounting means to load the recording medium in response to the instruction of the resource allocation means and issuing a loading instruction to the timer retry means upon receipt of the recording medium absence notice.

According to the preferred embodiment, the sharing control unit includes a loading state memory means for storing state information about the loading work for the I/O means. With reference to the state information stored in the loading state memory means, the timer retry means issues a reloading instruction.

According to another preferred embodiment, the sharing control unit includes a loading canceling means for releasing a timer located in the timer retry means, a unit releasing means for releasing the specified I/O means in response to a forced termination request from the computer and issuing a loading canceling instruction to the loading canceling means, and a loading canceling command generating means for issuing a loading canceling command to the loading canceling means through operator intervention and issuing a loading failure notice to the computer.

According to still another preferred embodiment, the present system further includes a loading canceling means for releasing a timer located in the timer retry means, a unit releasing means for releasing the specified I/O means in response to a forced termination request from the computer and issues a loading canceling instruction to the loading canceling means, and a loading canceling command generating means for issuing a loading canceling command to the loading canceling means through operator intervention and issuing a loading failure notice to the computer.

Other objects and effects of the invention will become apparent from the following description of embodiments.

DESCRIPTION OF THE PREFERRED EMBODIMENT

Figure 1:
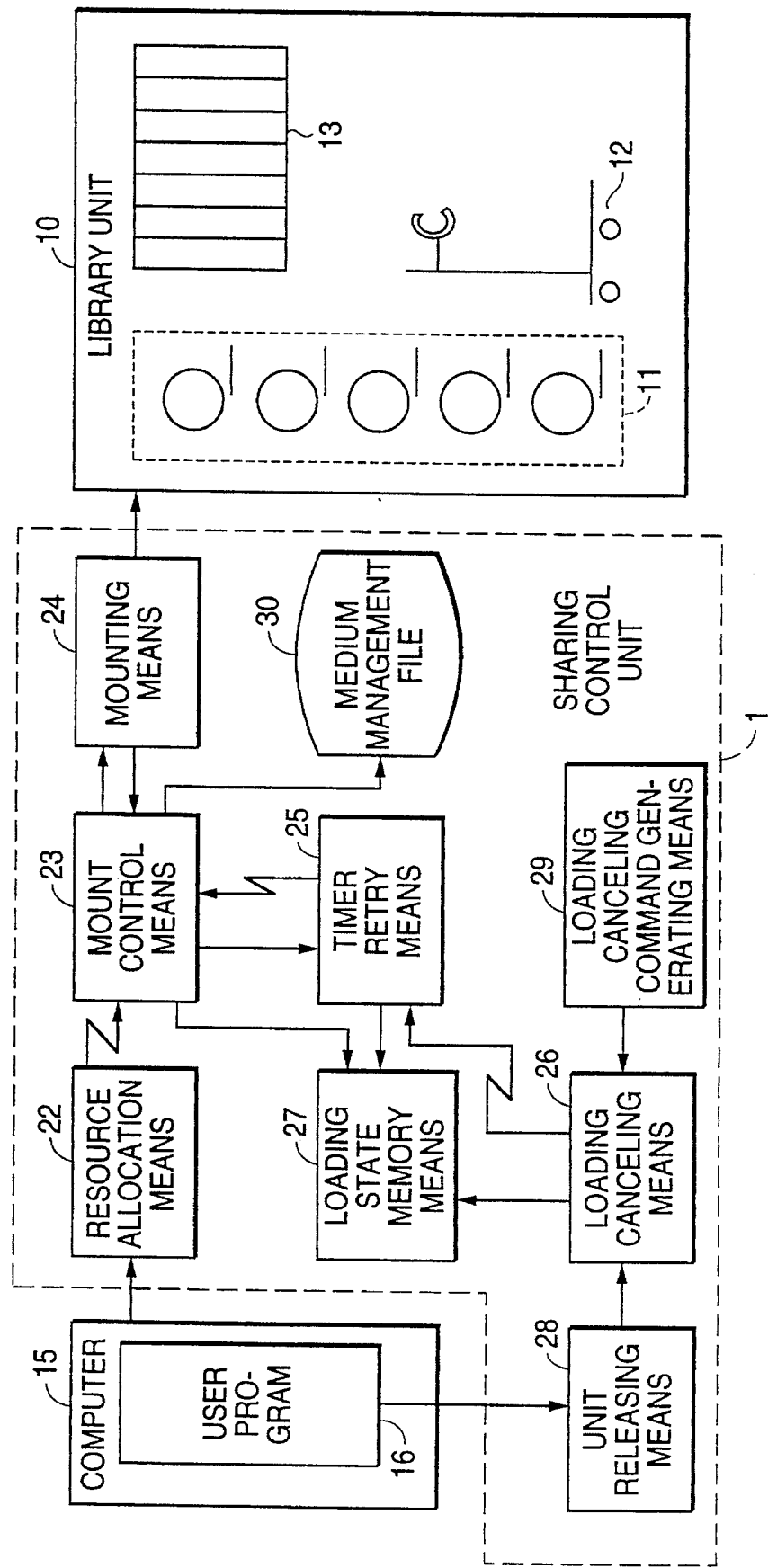
FIG. 1 is a block diagram showing the structure of a library unit sharing system according to an embodiment of the present invention.

Referring to FIG. 1, a preferred embodiment of the present invention is described below in detail.

In FIG. 1, a library unit sharing system according to the embodiment comprises a library unit 10, a sharing control unit 1, and a computer 15 which accesses the library unit 10.

The library unit 10 is an assembled-type unit exchangeably containing multiple recording media. The unit 10 includes multiple cells 13 each of which contains many recording media and has a cell address corresponding to each recording medium, multiple I/O units 11 for performing read/write operations on the recording media and establishing an I/O path from a host computer 15, and an accessor unit 12 for performing the loading operation between the cells 13 and the I/O units 11 with the cell address of a specified cell 13 and the address of a specified I/O unit 11.

Recording media contained in the cells 13 include magnetic tape cassettes, magnetic disks, and optical disks. In any case, several hundred or thousand of them are treated as a unit.

Each of the I/O units 11 includes a head for read/write operations on the recording media and a drive means and performs I/O operations to and from the external computer 15. Each I/O unit 11 has its own address.

The accessor unit 12 has a robot hand attached to it. The robot hand takes out a recording medium specified with a loading instruction from the appropriate cell 13 and loads it into an allocated I/O unit 11.

The library unit 10 accepts I/O instructions from multiple computers 15 simultaneously.

The sharing control unit 1 controls requests made by the multiple computers 15 to access the library unit 10. The unit 1 consists of a resource allocation means 22, a mount control means 23, a mounting means 24, a timer retry means 25, a loading canceling means 26, a loading state memory means 27, a unit releasing means 28, a loading canceling command generating means 29, and a medium management file 30.

The resource allocation means 22 allocates the I/O units 11 in response to a recording medium access request and issues a loading instruction for an appropriate recording medium.

In response to the loading instruction from the resource allocation means 22, the mount control means 23 directs the mounting means 24 to load the recording medium. When receiving a notice that the recording medium is absent, the mount control means 23 directs the timer retry means 25 to retry the loading of that medium after a certain period of time and directs the loading state memory means 27 to store a "loading being retried" setting.

The mounting means 24 makes an attempt to load the specified recording medium into the allocated I/O unit 11 from the cell 13. When the recording medium is not found in the cell 13, the mounting means 24 returns back a code of that effect. When the recording medium is normally loaded, the subsequent loading operations will continue.

The timer retry means 25 sets a built-in timer to a certain time for the specified I/O unit 11. After that time has elapsed, the timer retry means 25 refers to the loading state memory means 27 and it issues an instruction to automatically reload the recording medium when the appropriate unit is in the loading retry state.

The loading canceling means 26 checks to see if the specified unit is in the loading retry state by referring to the loading state memory means 27. If the unit is in the loading retry state, the loading canceling means 26 directs the loading state memory means 27 to cancel the "loading being retried" setting and resets the timer setting made by the timer retry means 25.

The loading state memory means 27 stores the progress of loading work performed by the I/O unit 11. Specifically, it stores the cell address of the recording medium for which the loading retry is done, the address of the allocated I/O unit 11, the loading work progress, and other loading information.

The unit releasing means 28 performs the resource releasing process for the specified unit and directs the loading canceling means 26 to cancel the loading into the unit.

The loading canceling command generating means 29 directs the loading canceling means 26 to cancel the loading for a unit specified by the operator and makes a loading failure notice to the user program 16.

The medium management file 30 manages the cell addresses of the cells 13 located in the library unit 10. The sharing control unit 1 gets the cell address of a specified recording medium from the medium management file 30 to load that medium into an appropriate I/O unit 11.

The sharing control unit 1 described above is located on the side of the library unit 10 or the computer 15.

The computer 15 which accesses the library unit 10 can be a general purpose computer or can be a workstation or other terminals. The computer 15 contains the user program 16 necessary to use the library unit 10 and the user program 16 allows access to the library unit 10.

Figure 2:
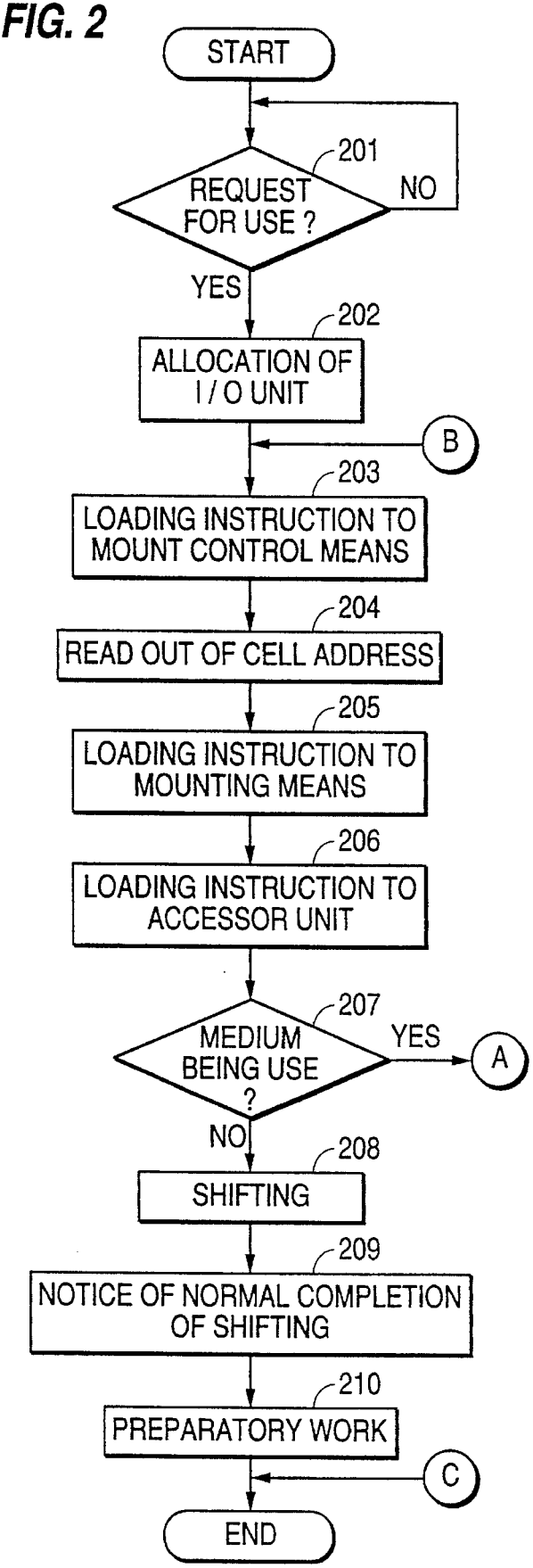
FIG. 2 is a flow chart for explaining the operations of the library unit sharing system shown in FIG. 1.

Referring to the flow charts in FIGS. 2 and 3, the operations of the present embodiment configured as above is described below in detail.

When the user program 16 running on the computer 15 makes a request to use a specific recording medium in the library unit 10 (Step 201), the resource allocation means 22 in the sharing control unit 1 selects an appropriate one among the I/O units 11 and allocates it to the user program 16 (Step 202). The allocation of the I/O unit 11 is accomplished by specifying the address of that I/O unit 11. At the same time, the resource allocation means 22 directs the mount control means 23 to load the access-requested recording medium into the selected I/O unit 11 (Step 203).

Upon receipt of that instruction, the mount control means 23 reads out the cell address of the specified recording medium with reference to the medium management file 30 (Step 204) and then issues to the mounting means 24 an instruction to take out the recording medium from the cell 13 corresponding to the specified cell address (Step 205). The mounting means 24 directs the accessor unit 12 to load the recording medium from the specified cell 13 into the specified I/O unit 11 (Step 206).

The accessor unit 12 then starts the loading process for the specified recording medium according to the instruction received. At the same time, the accessor unit 12 determines if the specified recording medium is being used by another computer 15 (Step 207).

If the recording medium is not being used, the accessor unit 12 takes out the recording medium from the cell 13 at the appropriate cell address and loads it into the addressed I/O unit 11 (Step 208). When the loading is normally completed, the accessor unit 12 makes a notice of normal loading termination to the mounting means 24 (Step 209). Then, upon receipt of the normal loading termination notice from the accessor unit 12, the mounting means 24 continues its I/O preparatory work, such as the loading of the recording medium and waiting for the recording medium to rotate, and checks the label of the recording medium to see if the correct recording medium has been loaded (Step 210).

Figure 3:
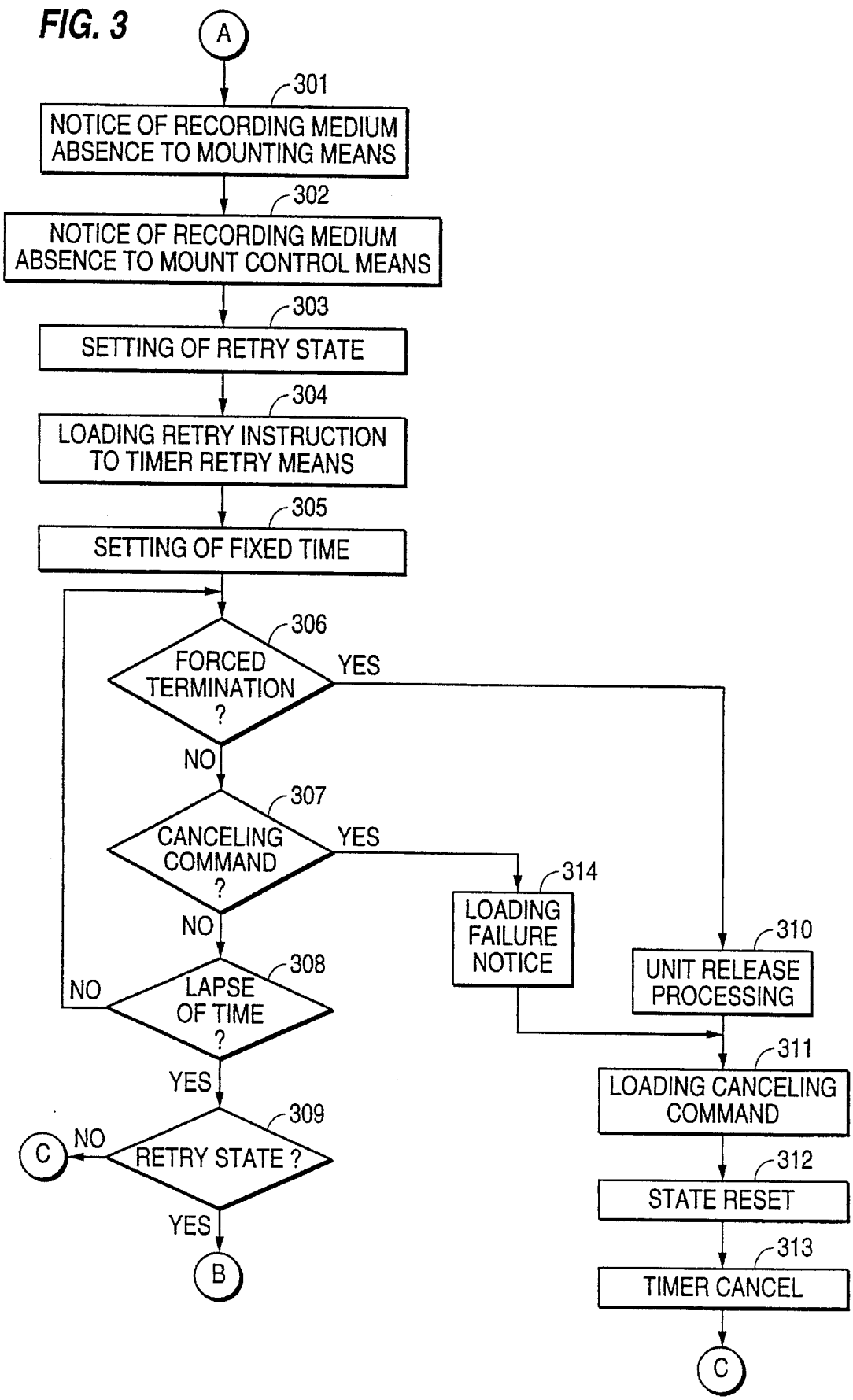
FIG. 3 is another flow chart for explaining the operations of the library unit sharing system shown in FIG. 1.

As shown in FIG. 3, if the specified recording medium is being used by another computer 15, the loading instruction results in an error because of the absence of that recording medium and a notice of recording medium absence is issued by the accessor unit 12 to the mounting means 24 (Step 301). When that notice is issued, the mounting means 24 makes a notice of recording medium absence to the mount control means 23 (Step 302).

Upon receipt of the recording medium absence notice, the mount control means 23 causes the loading state memory means 27 to store some information indicating that the system is in the loading retry state (hereinafter referred to as "loading retry state information") (Step 303) and issues a loading retry instruction to the timer retry means 25 (Step 304). This loading retry state information includes the cell address of a recording medium for which the loading retry is to be made, the address of the specified I/O unit 11, and the progress of the loading work.

The timer retry means 25 sets its timer to a certain period of time necessary for the retry operation as instructed (Step 305) and then terminates.

During the loading retry, the unit releasing means 28 determines if any forced termination request is made by the user program 16 (Step 306) as well as if the loading canceling command generating means 29 has been activated (Step 307).

When the set time has elapsed with no forced termination request made nor the loading canceling command generating means 29 activated (Step 308), the timer retry means 25 restarts. Then, the timer retry means 25 refers to the loading state memory means 27 to determine if it is in the loading retry state (Step 309). If it is in the loading retry state, the timer retry means 25 directs the mount control means 23 to reload the recording medium. For this purpose, some information necessary for the reloading work, for example, the cell address of the recording medium and the address of the specified I/O unit 11, is obtained by referring to the contents of the loading state memory means 27.

If another computer 15 has finished its use of the specified recording medium and the recording medium has been returned back in the cell 13 until the set time elapses, the reloading work causes the specified recording medium to be normally loaded according to the processes in Step 203 and the subsequent steps.

If the loading state memory means 27 is not in the retry state in Step 309, this means that the loading work is suspended by a forced termination request or due to the activation of the loading canceling command generating means 29. Then, the loading work terminates at this point.

If the loading work is suspended by a forced termination request or due to the activation of the loading canceling command generating means 29 within the time set for retry, the timer is usually conciliate to terminate the loading process without restarting the timer retry means 25 as described below. Therefore, the determination in Step 309 is not required in normal flow of process. If a forced termination request is made or the loading canceling command generating means 29 is activated at the time when the timer time has elapsed, however, the timer retry means 25 may restart before the loading process terminates. If this occurs, the process must be terminated by referring to the loading state memory means 27 to determine if it is in the retry state.

In addition, if another computer 15 is using the specified recording medium when the reloading is attempted, the mounting means 24 sends a notice of recording medium absence to the mount control means 23 again and then the timer retry means 25 is activated. The process described so far is repeated until another computer 15 finishes its use of that recording medium and returns it to the cell 13.

If the user program 16 terminates upon receipt of a forced termination request from the operator during the loading retry, the unit releasing means 28 operates to release the specified I/O unit 11 (Step 310) and directs the loading canceling means 26 to cancel the loading work (Step 311).

Upon receipt of the loading canceling command, the loading canceling means 26 refers to the loading state memory means 27 to obtain state information for the specified unit. If the unit is in the loading retry state, the loading canceling means 26 resets the loading state memory means 27 (Step 312) and releases the timer set in the timer retry means 25 (Step 313).

If another computer 15 fails to return the specified medium to the cell 13 or if the specified medium does not exist in the cell 13 from the beginning, the retry operation is repeated many times. If the operator finds out this failure, he (or she) activates the loading canceling command generating means 29 (Step 307). The loading canceling command generating means 29 issues a loading failure notice to the user program 16 (Step 314) and directs the loading canceling means 26 to suspend the loading process. This causes the loading state memory means 27 to be reset and the timer of the timer retry means 25 to be released (Steps 311 to 313).

The library unit sharing system according to the present embodiment is configured and operates as described above. It should be understood by those skilled in the art that this forces the succeeding computer to wait until the preceding computer 15 finishes its use of a recording medium even if multiple requests are made by those computers to access the same recording medium simultaneously. This can provide sequential usage of the recording medium and prevent any loading failure or abnormal program termination due to the absence of a recording medium.

It should be further appreciated that the present invention is not limited to the preferred embodiment and various changes and modifications may be made. For example, the sharing control unit 1 may be on the side of the library unit 10 or on the side of the computer 15. All such modifications as fall within the true spirit and scope of the invention should be covered by the appended claims.

What is claimed is:

1. A library unit sharing system which implements sequential usage of recording media if multiple requests are simultaneously made by a plurality of computers to access the same recording media, said system comprising:

(a) a library unit which can be shared and accessed by said plurality of computers, including
        (1) a plurality of cells containing a plurality of recording media each having its own cell address,
        (2) a plurality of I/O units for performing read/write operations on said recording media, and
        (3) an accessor unit having a robot hand to load a recording medium into one of said I/O units, said accessor unit issuing a normal loading termination notice when loading of said recording medium is completed;
    (b) a sharing control unit which controls access to said library unit by said plurality of computers, including
        (1) a medium management means for storing and managing the cell addresses of said recording media,
        (2) a resource allocation means for allocating an I/O unit in response to a recording medium access request made by one of said plurality of computers and issuing an instruction to load a recording medium specified by the recording medium access request into the allocated I/O unit,
        (3) a mounting means for controlling loading of the specified recording medium by said accessor unit into the allocated I/O unit by instructing said accessor unit to position the robot hand of said accessor unit to retrieve the specified recording medium for loading into the allocated I/O unit, said mounting means issuing a recording medium absence notice if the robot hand cannot retrieve the specified recording medium because the specified recording medium is absent from its storage cell, wherein said mounting means, upon receipt of said normal loading termination notice from said accessor unit, proceeds with I/O prepatory work, said I/O prepatory work including waiting for the specified recording medium to rotate and checking a label of the specified recording medium to verify that a correct recording medium has been loaded,
        (4) a loading state memory means for storing, upon receipt of a loading retry instruction, a loading progress information including the cell address of the specified recording medium, an address of the allocated I/O unit, and an indication that the allocated I/O unit is in a loading retry state, (5) a timer retry means for setting, upon receipt of the loading retry instruction, a predetermined period of time on a timer for the allocated I/O unit, for determining, after the predetermined period of time has elapsed, if the allocated I/O unit is in the loading retry state by referring to said loading state memory means, and for issuing a reloading instruction if the allocated I/O unit is in the loading retry state, and (6) a mount control means for reading out the cell address of the specified recording medium by referring to said medium management means in response to the instruction received from said resource allocation means and issuing an instruction to load the specified recording medium into the allocated I/O unit to said mounting means, and for issuing, upon receipt of the recording medium absence notice from said mounting means, the loading retry instruction which directs said timer retry means to retry the loading of the specified recording medium after the predetermined period of time has elapsed and directs said loading state memory means to store the loading retry state, (7) a loading canceling means for determining, in response to a forced termination request, if the allocated I/O unit is in the loading retry state by referring to said loading state memory means, and if so, for resetting the timer for the allocated I/O unit and canceling the indication that the allocated I/O unit is in the loading retry state, (8) a unit releasing means for determining if the forced termination request is issued by said one of said plurality of computers and issuing the forced termination request to said loading canceling means, and (9) a loading canceling command generating means for issuing the forced termination request specified by a system operator to said loading canceling means and issuing a loading failure notice to said one of said plurality of computers.

* * * * *